United States Patent [19]

Anstey

[11] Patent Number: 5,717,170
[45] Date of Patent: Feb. 10, 1998

[54] SWINGING-WEIGHT VIBRATOR FOR SEISMIC EXPLORATION

[76] Inventor: Nigel A. Anstey, Cedar Lodge, Glen Mona, Isle of Man, IM7 1HG

[21] Appl. No.: 725,567

[22] Filed: Oct. 3, 1996

[30] Foreign Application Priority Data

Dec. 2, 1995 [GB] United Kingdom ............... 9524689

[51] Int. Cl.$^6$ ........................................ G01V 1/04
[52] U.S. Cl. ........................ 181/121; 367/189; 367/75; 181/113
[58] Field of Search .................... 367/189, 190, 367/75; 181/113, 114, 121

[56] References Cited

U.S. PATENT DOCUMENTS

| | | | |
|---|---|---|---|
| 4,749,057 | 6/1988 | Anstey | 181/121 |
| 4,907,670 | 3/1990 | Anstey | 181/121 |
| 4,959,818 | 9/1990 | Cole | 367/189 |
| 5,135,072 | 8/1992 | Meynier | 181/106 |
| 5,166,909 | 11/1992 | Cole et al. | 367/189 |

*Primary Examiner*—J. Woodrow Eldred
*Attorney, Agent, or Firm*—Chris A. Caseiro; Thomas L. Bohan

[57] ABSTRACT

Seismic exploration for hydrocarbons may use an eccentric-mass (or "swinging-weight") vibrator as the seismic source. According to the invention, a vibrator undergoes alternate periods of acceleration and deceleration, during one of which the vibration may be annulled. For example, the rotating mass may be formed in a plurality of parts; then the several parts are disposed in a manner that rapidly and automatically balances their vibratory forces during the period when the vibration is to be annulled, and that adds their vibratory forces during the other period. The invention further provides for modulation of the frequency-time relation during deceleration, for synchronization of several vibrators, and for modulation of the effective output force by controllable variation of the mass, eccentric radius or relative phase of the several parts of the rotating mass; in such modulation, only resultant forces are applied to the vibrator bearings.

16 Claims, 8 Drawing Sheets

$m \times r = M \times R$

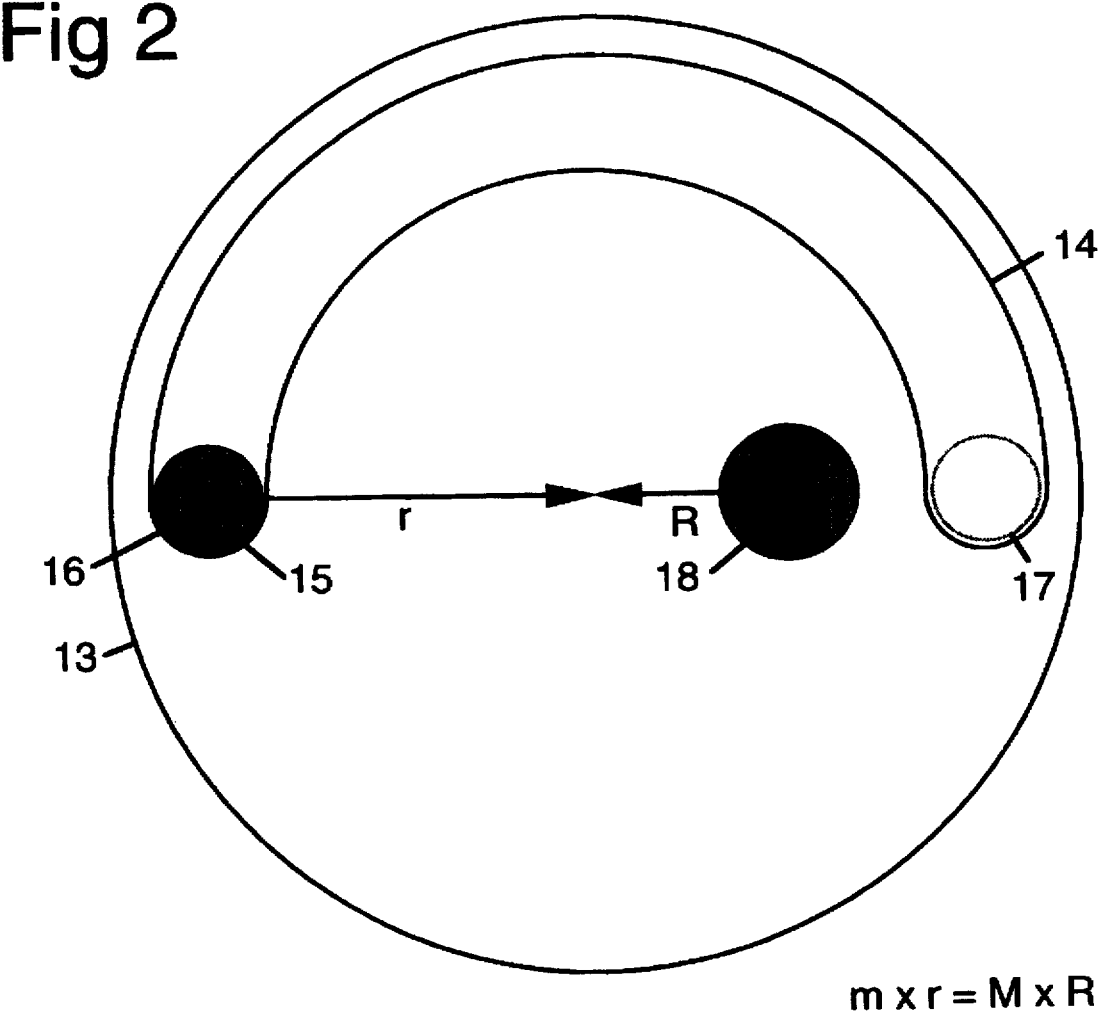

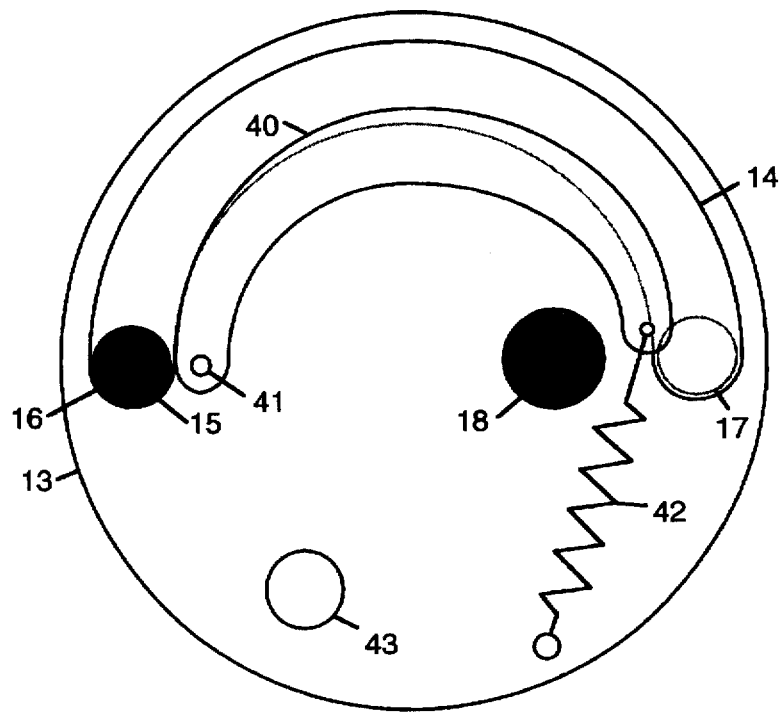
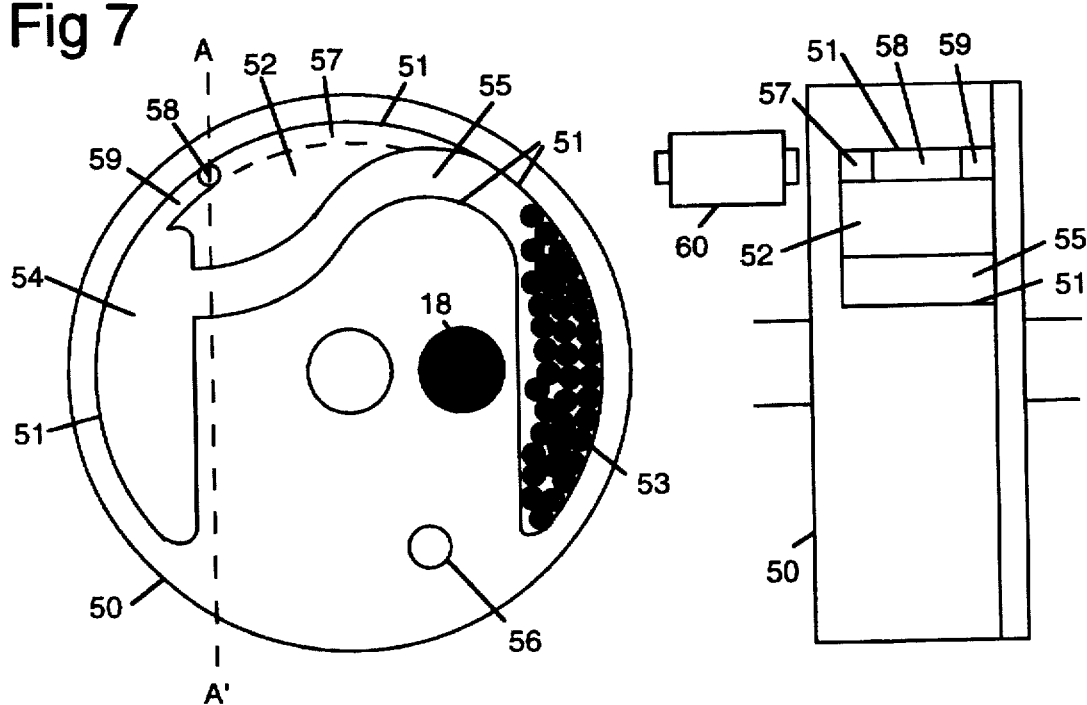

SWINGING-WEIGHT VIBRATOR FOR SEISMIC EXPLORATION

CROSS REFERENCES TO RELATED APPLICATIONS

This patent application is based upon British patent application 9524689.8, of the same title. Applicant filed this British application on Dec. 2, 1995, and herewith claims the priority date of this application. The invention represents a further development of the swinging-weight vibrator described in U.S. Pat. No. 4,749,057, entitled "Seismic exploration with a swinging-weight vibrator," to the present inventor. Advantageous methods of using the present invention (particularly in 3-D seismic surveys) are described in copending application Ser. No. 08/712,432 is derived from British application 9617445.3, entitled "3-D seismic survey using multiple sources simultaneously," filed Aug. 20, 1996. An application of some features of the present invention, but configured for near-surface ground surveys, is described in copending application Ser. No. 08/705,767 is derived from British application 9615576.7, entitled "Vibratory ground-survey system," filed Jul. 24, 1996.

TECHNICAL FIELD

This invention is concerned with eccentric-mass vibrators (often loosely called "swinging-weight" vibrators) for use in the Vibroseis system of seismic exploration for oil and gas.

BACKGROUND ART

The dominant technique for seismic exploration on land (the Vibroseis system) involves the transmission into the earth of a long vibratory signal, the reflection of this signal from deep rock layers, the subsequent reception of the reflected signal by geophones disposed at the surface, and the cross-correlation of the received signal against the transmitted signal. The transmitted signal must be unique, of a defined frequency range, and nonrepetitive within the maximum reflection time of interest; the signal employed is usually of swept-frequency form. Both upsweeps and downsweeps are used.

Standard practice involves a group of several large truck-mounted vibrators for transmission of the swept-frequency signal into the earth. The vibrators are driven in synchronism, to follow a prescribed swept-frequency signal. At each test location, the group of vibrators might emit eight sweeps, each of perhaps 26 s duration and with a 6-s gap between sweeps.

In the early days of the Vibroseis system, when only one vibrator was used, the vibrator was of simple swinging-weight type. As it became apparent that several vibrators were needed, and that these vibrators would need to be driven in synchronism, the swinging-weight vibrator was abandoned in favour of hydraulic vibrators; in these a hydraulic servo-valve, coupled to electrical control circuitry, allows the vibrator motion to be slaved accurately to the prescribed swept-frequency signal.

However, hydraulic vibrators are complex, inefficient and costly, whereas the old swinging-weight vibrator was simple, efficient and cheap.

Accordingly the present inventor, in U.S. Pat. No. 4,749,057, has described an adaptation of the old swinging-weight vibrator for later practice. In particular, this patent describes a swinging-weight vibrator driven by a flywheel. A motor accelerates the flywheel to a desired start frequency; during this time the eccentricity of the swinging weight may be annulled, so that no vibration is transmitted to the earth. Then the eccentricity is restored, and the vibrator coasts down to a desired end frequency; during this time much of the energy stored in the flywheel is transformed into swept-frequency vibrations transmitted into the earth. The cycle may then be repeated.

In the invention of U.S. Pat. No. 4,749,057, one method by which the eccentricity may be annulled involves the movement of the eccentric mass from an unbalanced position (in which large vibratory forces are generated) to a balanced position (in which no vibratory forces are generated). This movement may also be controlled to give any desired variation of the vibratory forces with frequency. Another method involves the use of two separate vibrators and the provision of a controllable phase angle between them.

OBJECTS OF THE INVENTION

The object of the present invention is to improve on these prior methods of controlling and annulling the force output of a swinging-weight vibrator. In particular, these improvements seek to reduce the time taken to annul the vibration, to provide a controllable variation of frequency with time, to allow the synchronization of several vibrators, to provide force control in a simpler and cheaper manner, and to reduce the bearing stresses imposed in prior-art vibrators.

DISCLOSURE OF THE INVENTION

These objects are achieved in a swinging-weight vibrator, adapted to operate in cycles each involving a period of acceleration and a period of deceleration, and consisting of a rotating support means and one or more masses of which at least one is capable of motion relative to the said support means between first and second limiting positions, such limiting positions being such that in one of them the rotating structure is balanced and engenders no vibration while in the other the structure is unbalanced and does engender vibration, and in which said relative motion between said first and second limiting positions is induced by acceleration of the vibrator and between said second and first limiting positions by deceleration of the vibrator. Then in such an arrangement the effective force output of the vibrator may be controlled by variation in the mass or radius of the said mass or masses, or by variation of the phase of such mass or masses relative to the support means or each other. During such control only resultant forces are transmitted through the main bearings.

In a preferred form of the invention, in which the vibrator is driven by a motor during the (balanced) acceleration period and by a flywheel during the (unbalanced) deceleration period, these objects are further achieved by maintaining some energization of the motor during the deceleration period.

BRIEF DESCRIPTION OF THE DRAWINGS

The invention will now be described with reference to the drawings, in which:

FIG. 2 illustrates a single vibrator having two eccentric masses, relative motion between which can cause rapid transitions between the balanced and unbalanced states;

FIG. 6 shows an adaptation of FIG. 2, further providing automatic control of output force as a function of frequency;

FIG. 7 illustrates an arrangement in which the mass is formed in many parts, and in which the force-frequency relation can be controlled remotely;

BEST MODE FOR CARRYING OUT THE INVENTION

Figure 1A:
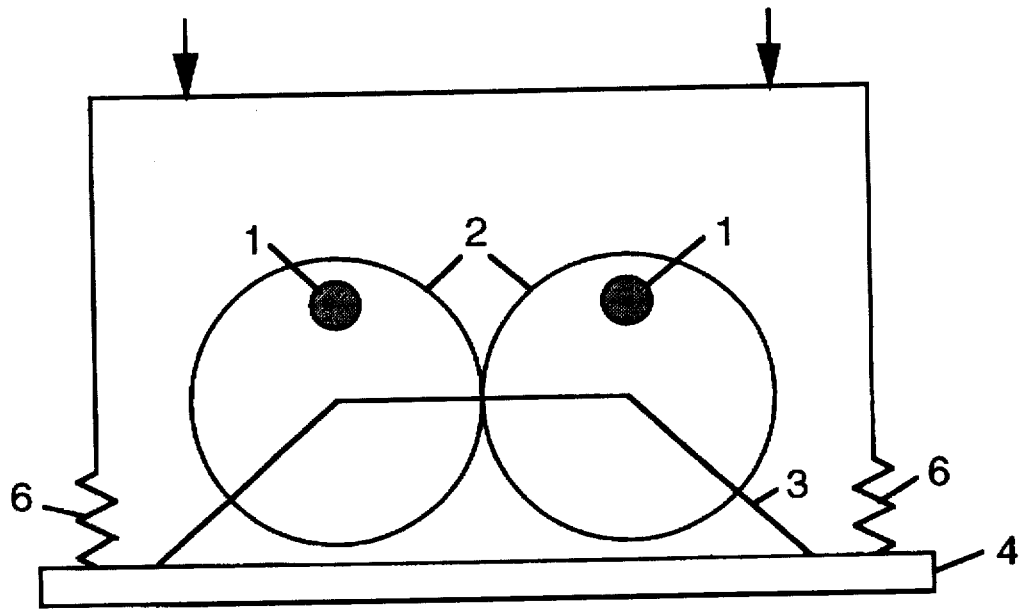
FIG. 1A and B illustrates the prior art in swinging-weight vibrators.
Figure 1B:
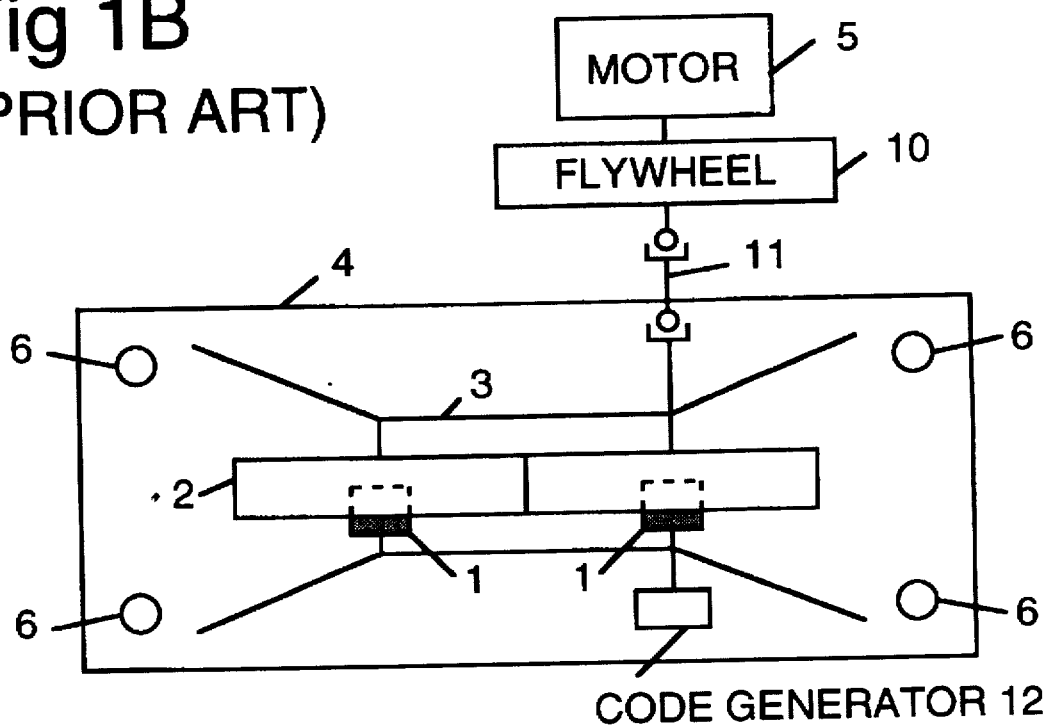

The basic scheme of a swinging-weight vibrator applied to seismic exploration is illustrated in FIGS. 1A and 1B (from the aforesaid U.S. Pat. No. 4,749,057). Two contra-rotating gear wheels 2 carrying eccentric masses 1 are supported on a frame 3, by which the vertical component of vibration is transmitted to baseplate 4. Hold-down weight (indicated by vertical arrows) is applied to the baseplate 4 through springs 6, whose natural frequency is chosen to be below the lowest vibration frequency.

Supported separately, in order to reduce the mass on the baseplate, are a motor 5 and flywheel 10, which drive the vibrator through a flexible coupling 11. A code generator 12 gives the frequency-time relation of the vibratory down-sweep.

The problems addressed by the present invention are those of annulling the vibration when desired (for example, during the acceleration phase), and of controlling the output of the vibrator during the other phase (thus yielding a desired variation of output with frequency, and of frequency with time).

One simple way of annulling the vibration during acceleration, according to the present invention, is illustrated in FIG. 2. In this each of the gear wheels 2 of FIG. 1 takes the form 13 of FIG. 2. A curved track 14 (which may be semicircular) is formed in each wheel, to allow the free rolling of a mass 15 (which may be a steel ball) between positions 16 and 17. A second mass 18 is fixed to the wheel, at smaller radius. The masses and radii are such that their products are equal, so that when mass 15 is in position 16 (in particular, when the wheel 13 is accelerating clockwise) the masses are balanced, and no vibration is imparted to the shaft. During deceleration, however, the mass 15 flies round to position 17, and the mass-radius products of the two masses add to provide a highly eccentric vibrator, with a force output double that of either mass alone. Therefore the operation of switching on the motor, in that it imparts an acceleration to the shaft, automatically and rapidly annuls any vibration, and allows the vibrator not only to be run up to the maximum desired frequency but also to be moved while this is being done. Conversely the operation of switching off the motor, so that the vibrator is driven by the flywheel, automatically starts the desired vibratory down-sweep.

In this arrangement, the mass 15 combines the function of an eccentric mass with the function of a lost-motion device.

The scheme of FIG. 2 is particularly appropriate to small and medium-sized vibrators. In principle it can be scaled up to large size, but in practice this requires undesirably large wheels 13. The arrangement of FIG. 3 is therefore more appropriate to large vibrators; it replaces the rolling ball 15 and the mass 18 by masses in the form of rods or similar extended bodies.

Figure 3:
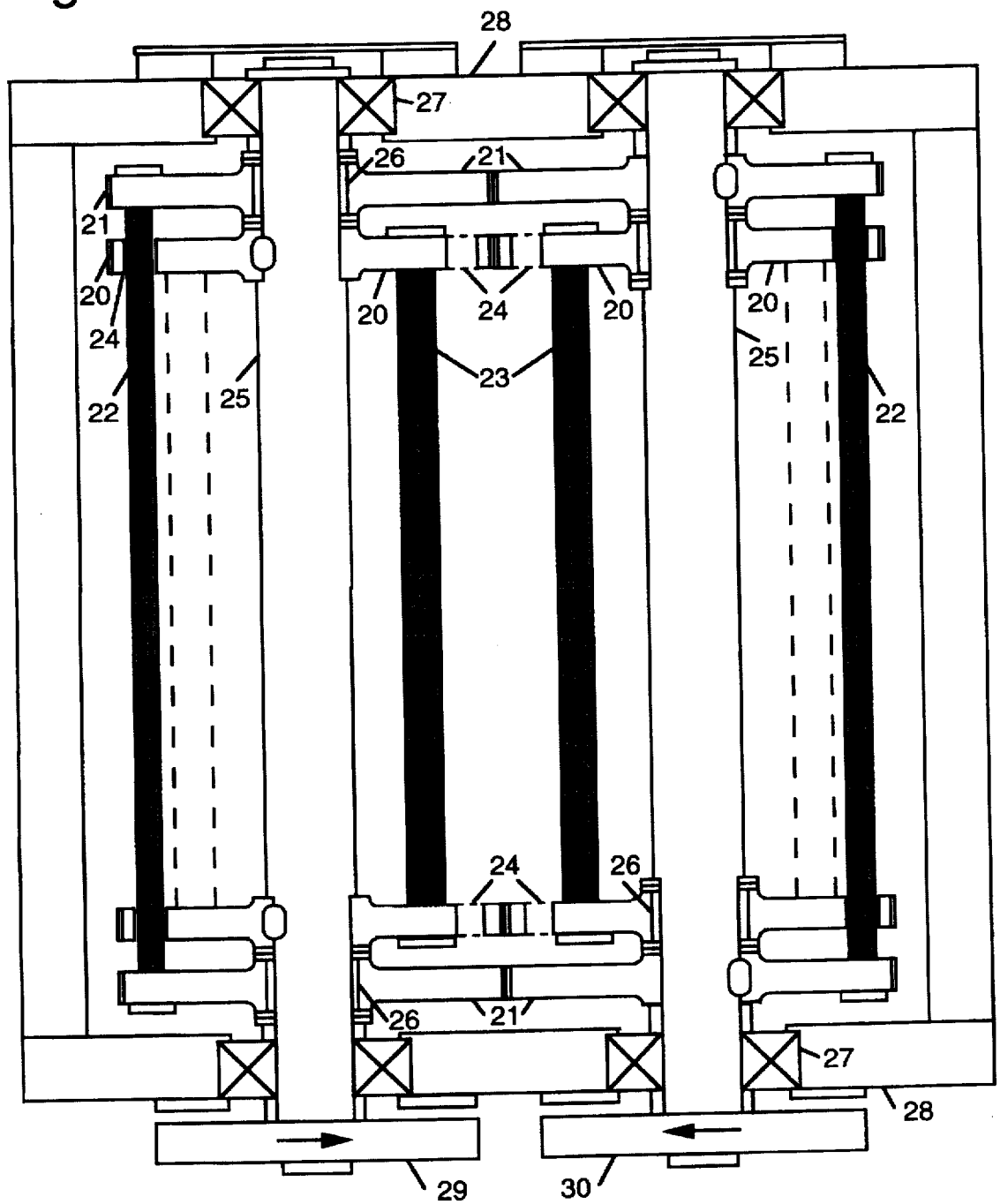
FIG. 3 shows an adaptation of FIG. 2 for a large-scale vibrator.

In FIG. 3, the single wheel 13 of FIG. 2 becomes four wheels 20, 21 (each, of course, meshing with a contra-rotating counterpart). The mass 15 (at the larger radius) becomes the extended mass 22. The wheels 21 are simple discs, while the wheels 20 contain a slot 24 equivalent to the track 14 of FIG. 2. The wheels 20 (for example) are keyed or splined to the shaft 25, while the wheels 21 are free to rotate on the shaft through a semicircle; to this end, bearings 26 (which may be sleeve bearings) are provided. The shaft 25 is free to rotate in bearings 27 (which may be ball bearings capable of withstanding sidethrust). The shaft 25, the bearings 26, the bearings 27 and the containing frame 28 must all be capable of withstanding the very considerable vibratory forces generated.

The contra-rotating counterparts of all these components are the same, except that in these it is the outer wheels 21 that are keyed or splined to the shaft, and the inner wheels 20 that are free to rotate through a semicircle.

The shaft 25 is driven by a coupling generally represented at 29, and its contra-rotating counterpart by a similar coupling 30. These couplings may be of cog type to receive a chain drive, or of gear type to receive a shaft drive.

It is apparent from FIG. 3 that when drive is applied to the vibrator through coupling 29, in the direction indicated, the mass 23 turns to the position shown dashed, and the vibrator is fully active. However, when the drive is applied through coupling 30, in the contra-rotating direction, the mass 23 turns to the position shown full, and the vibration is annulled. Therefore the desired performance can be achieved by driving through coupling 30 during acceleration (that is, from the motor), and through coupling 29 during deceleration (that is, from the flywheel).

The physical configiration of FIG. 3 is very desirable in a vibrator. The extended masses allow a small radius of rotation, which keeps the vibrator low and stable on the baseplate. The total mass of the vibrator is relatively small. An in-phase force is applied to the frame 28 (and thence to the baseplate) at four spaced-apart points (the bearings 27); this distribution of force reduces the problem of baseplate flexure. And the general external form of the vibrator lends itself to the mounting of two (or more) units on the baseplate, spaced apart to allow the vehicle's propeller shaft to pass between them.

Figure 4:
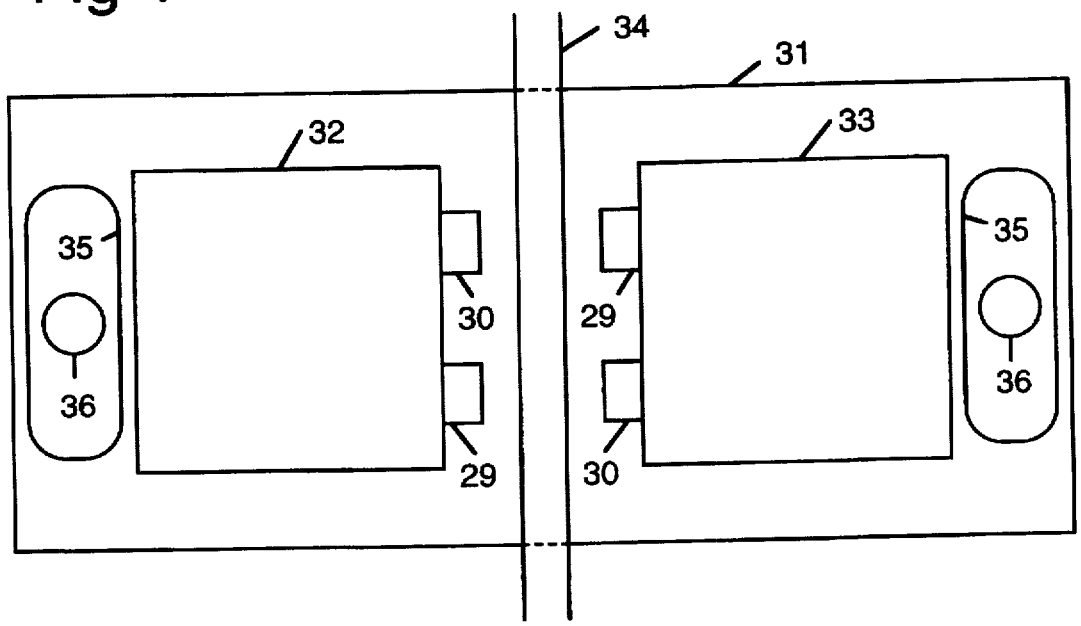
FIG. 4 shows how multiple vibrators of the form of FIG. 3 may be mounted on one baseplate.

FIG. 4 illustrates in plan such an arrangement, where the baseplate is represented at 31 and two vibrators at 32 and 33. The propeller shaft between them is shown at 34. Power to the vibrators is supplied, as in FIG. 3, through couplings 30 during acceleration and through couplings 29 during deceleration. Also indicated schematically are airbags 35 (performing the function of the springs 6 in FIG. 1) and the guide posts 36 of a hydraulic (or other) lift system for lowering and raising the baseplate, as in the prior art.

Figure 5:
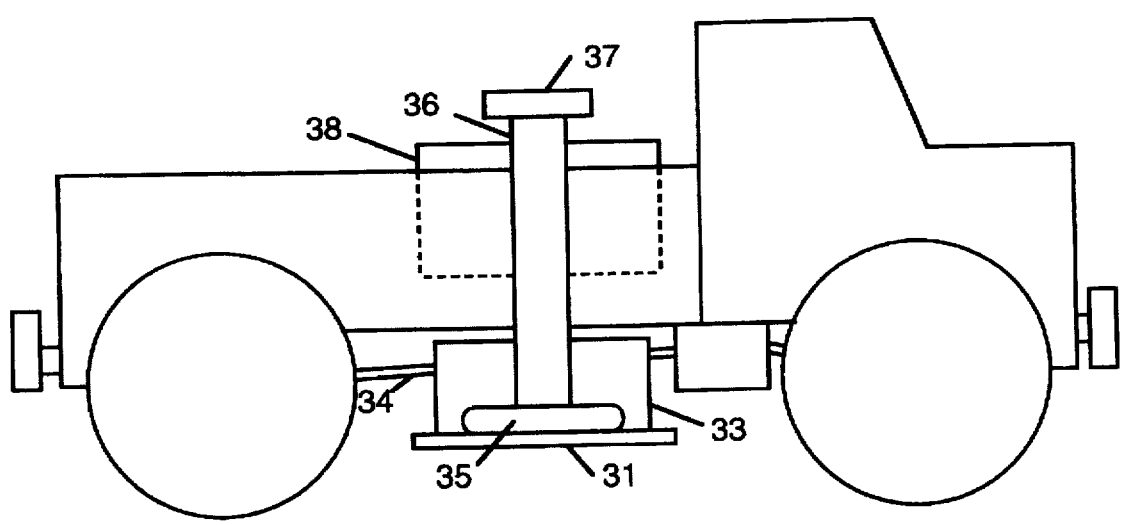
FIG. 5 shows the arrangement of FIG. 4 mounted on a vehicle.

FIG. 5 illustrates in elevation the arrangement of FIG. 4 mounted on a vehicle. The baseplate 31 and vibrator 33 are shown in the up position, for movement; the vibration is annulled, and the vibrator may be accelerated. Compared to a hydraulic vibrator, the centre of gravity of the vehicle is advantageously low. In the down position (not shown), the baseplate is in contact with the ground, the vehicle weight is applied to the lift system 36, and the arrangement is ready to transmit decelerating vibration into the earth. The drive system 38, for providing drive to couplings 29 and 30, is advantageously supported from the transom 37 of the lift system; then the relative motion between drive system and couplings (which must be accommodated by the chain-drive or gear-shaft between them) is restricted to the compression of the airbags 35 as the vehicle weight is applied.

Before description of the details of the drive system 38, some discussion of the desired force output is appropriate. A basic swinging-weight vibrator yields a force output proportional to the square of frequency. Thus in FIGS. 3 and 4, for example, the length of the outer mass 22 may be 500 mm, its mass 5 kg and its radius of rotation 100 mm; the vibratory force it develops is then about 200 kN at 100 Hz, 20 kN at 30 Hz and 2 kN at 10 Hz. Addition of the inner mass doubles these figures, addition of the contra-rotating masses doubles them again, and the second vibrator on the baseplate doubles again; the resulting force figures are 1600 kN at 100 Hz, 160 kN at 30 Hz and 16 kN at 10 Hz. At high frequency the force is very large indeed, exceeding the hold-down weight of any reasonably sized vehicle; at medium frequency the force is very suitable, while at low frequency it may be marginal.

It is well known that the high-frequency content of seismic signals is severely attenuated during transmission through the earth, and that this constitutes a very unwelcome constraint on the layer resolution obtainable by the seismic method. In principle, therefore, a vibrator output that rises with frequency is highly desirable, as a precompensation of this attenuation. However, the output of medium frequencies must also be adequate. At low frequencies a somewhat increased output is desirable on considerations of the small size of the source; however, this increase is often made unacceptable by the increased generation of undesirable surface waves at low frequencies, and it is common practice to accept reduced output. On balance, therefore, any system design must provide adequate output at medium frequencies, and preferably some increase of output at the high frequencies—but not so much that no practical vehicle can hold the baseplate down.

However, the effective output of the vibrator, in a Vibroseis application, depends not only on the applied force but also the time over which the force is applied. A basic swinging-weight vibrator, driven by a flywheel in free deceleration, dwells only briefly in any 1-Hz band at high frequencies, but much longer in a 1-Hz band at low frequencies. Therefore the frequency-time relation must be considered, in addition to the force-frequency relation.

To provide total flexibility, it is desirable that both relations be controllable. A method for controlling the frequency-time relation is described hereinafter in relation to FIGS. 11 and 12; in essence, this method maintains some power to the motor during the deceleration phase (to a degree determined by a feedback loop), and so restrains the deceleration of the flywheel. Methods for controlling the force-frequency relation will now be described, initially in relation to the rolling-ball vibrator of FIG. 2, and then in relation to the large vibrator of FIGS. 3–5. (These methods are in addition to those described in the aforesaid U.S. Pat. No. 4,749,057.)

FIG. 6 illustrates an adaptation of FIG. 2, in which the desired force-frequency relation is built into the device. The ball 15, the mass 18 and the outside edge of the track 14 are as before. However, the inner edge of the track 14 is now formed by the outer edge of a cam 40. This cam is pivoted at 41 and constrained by a spring 42. In the stationary condition, and at the lowest desired frequencies, the spring 42 holds the cam 40 back against a stop (not shown), so that the outer edge of the cam corresponds with the previous inner edge of the track 14; then the ball may roll freely from position 17 to position 16 on acceleration, as before. As the shaft accelerates further, however, the cam 40 begins to fly outwards, about the pivot 41 and against the spring 42. This restricts the width of the track 14, so that the ball ejected from the position 16 by deceleration is able to pass only a small way along the track. Since this provides a measure of eccentricity, further deceleration is induced; the spring 42 then pulls the cam 40 back somewhat, and the ball rolls further and further round the track (progressively increasing the eccentricity) until at low frequency it finally reaches the position 17.

The controlled eccentricity, in this implementation, is provided by varying the phase between the forces generated by the fixed mass 18 and the rolling mass 15. It is clear that a variety of force-frequency relations may be obtained by choice of the cam profile and the spring constant. The eccentric mass of the cam and the spring, in the withdrawn position, may be balanced with a fixed mass 43. The provision of eccentricity by control of phase, on each single wheel 13, has the virtue that only the resultant force is applied to the bearings.

FIG. 7 shows, in elevation and section, an adaptation that allows the force-frequency relation to be controlled externally, and with more flexibility. The basic wheel 50 is milled out in the form of the track indicated by repeated numerals 51. Filling a part of the void so created is a guide member 52, firmly attached to the wheel. The combination of the milled track 51 and the guide member 52 defines two broadly symmetrical compartments 53 and 54, separated by a curved track 55. The form of the track 55 is such that, if the compartment 53 is filled with small iron balls, a rapid acceleration of the wheel 50 causes the balls to migrate through the track 55 into the compartment 54. In so doing, the balls effectively balance the mass 18, and allow the wheel to accerate further without vibration. In contradistinction to the wheel of FIG. 2, however, subsequent deceleration of the wheel does not provoke the migration of the balls from the balanced position (compartment 54) to the unbalanced position (compartment 53).

The guide member 52, in addition to defining the outside edge of the large track 55, also contains a small track 57, 58, 59, of dimension sufficient to allow passage of one ball only. This small track is at the rearward part of the Figure over its extent 57 and at the forward part over its extent 59; these two extents are joined by the extent 58, which is a hole perpendicular to the plane of the (non-ferrous) wheel 50. It is therefore possible, during deceleration, for one ball at a time to enter the track 59 from the balance compartment 54, to move at right angles through the track 58, to enter track 57, and so to discharge into the off-balance compartment 53. However, no force acts on it to provoke passage through the perpendicular track 58. Such a force may be provided, for example, by a magnet 60, at the same radius as the track and perpendicular to the plane of the wheel. This magnet, as track 58 passes it, causes the ball in track 59 to be attracted into track 57, thereby supplementing the off-balance mass in compartment 53. If the magnet 60 is a permanent magnet, one ball is added in compartment 53 on each revolution of the wheel. If the magnet 60 is an electromagnet, one ball may be added on each revolution, or every second revolution, or as desired; thus, by programming the excitation of the electromagnet, any desired force-time or force-frequency response may be achieved.

As noted above, subsequent acceleration of the wheel 50 causes the accumulated balls in compartment 53 to migrate along the wide track 55 into compartment 54. However, a few enter track 57, where they are trapped. In this trapped condition, they (in combination with the asymmetrical effects of the guide 52 and the track 55) are balanced by the balance mass 56. On deceleration, these balls immediately migrate into compartment 53, thereby generating a small vibratory force at the highest frequency; clearly, the magnitude of this initial force is defined by the chosen length of track 57.

Like the arrangment of FIGS. 2 and 6, this arrangement applies only resultant forces to the supporting bearings.

Figure 8:
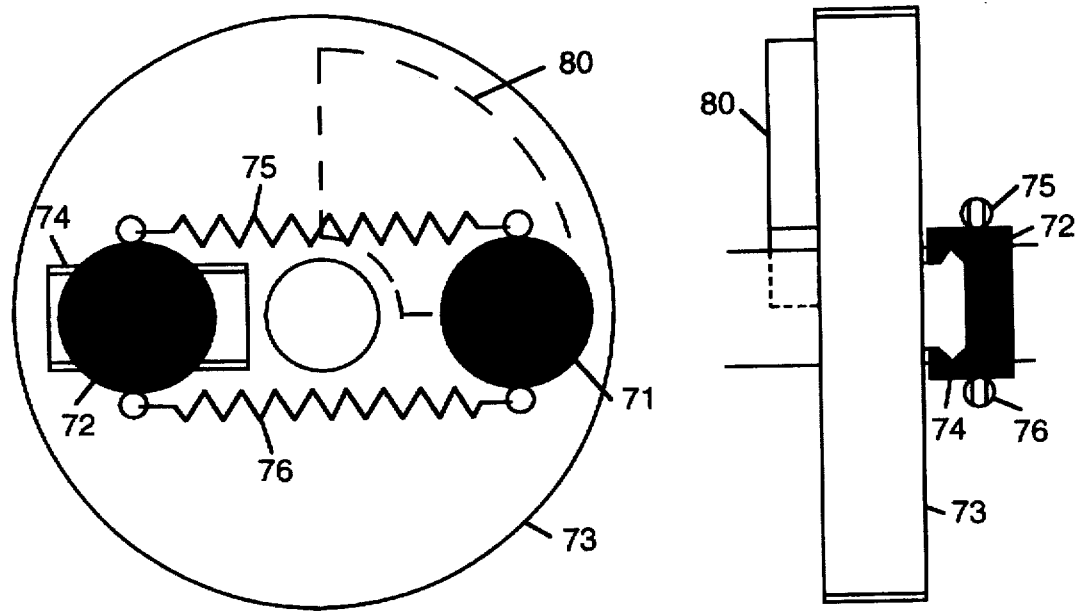
FIG. 8 depicts a vibrator in which the force-frequency relation is controlled by variation of the eccentric radius of one mass part.

FIG. 8 illustrates another method for controlling the force-frequency relation. In this the two masses 71 and 72, on their effective mountings, are conveniently (though not necessarily) equal. Mass 71 is mounted in a fixed eccentric position on the wheel 73, while mass 72 is able to slide radially on the fixed member 74. The two masses are linked with springs 75, 76. At high speed the mass 72 is forced outward to a stop (not shown), against the tension in the springs; in this condition the effective masses are balanced, and there is no vibration. During deceleration, however, the springs progressively decrease the effective radius of the mass 72; the unbalanced mass increases as the frequency decreases. Variable-rate springs may be used to obtain particular force-frequency relations.

In this device, again, there are only resultant forces on the bearings. However, the resultant effective mass at low frequency is the difference between the two eccentric masses, rather than their sum as in the previous Figure. Therefore, for a given output, this device requires larger masses.

Figure 9:
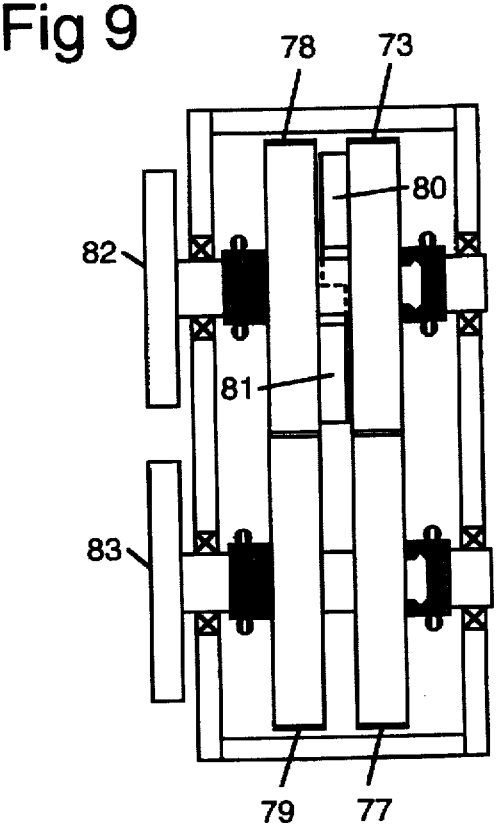
FIG. 9 shows how vibrators (for example, of the form of FIG. 8) may be linked with a lost-motion device to add a rapid transition between balanced and unbalanced states.

Since the device of FIG. 8 does not annul the vibration during acceleration, a pair of such devices must be provided, with a 180° lost-motion device between them. FIG. 9 illustrates a practical arrangement. The wheel 73 is shown, together with its contra-rotating counterpart 77. Another wheel 78 is provided, with its contra-rotating counterpart 79. Wheels 73 and 79 are keyed or splined to their shafts, while wheels 77 and 78 are free to rotate on their shafts. A raised quadrant 80 on one of the wheels (such as wheel 73) cooperates with a similar but orthogonal quadrant 81 on the other wheel on the same shaft, allowing a relative rotation of 180° between these wheels (and between their contra-rotating counterparts). Then (as with couplings 29 and 30 in FIG. 3), the coupling 82 may be driven by the motor, and the coupling 83 by the flywheel; in this way the vibration is annulled quickly by acceleration, and induced quickly by deceleration.

Figure 10:
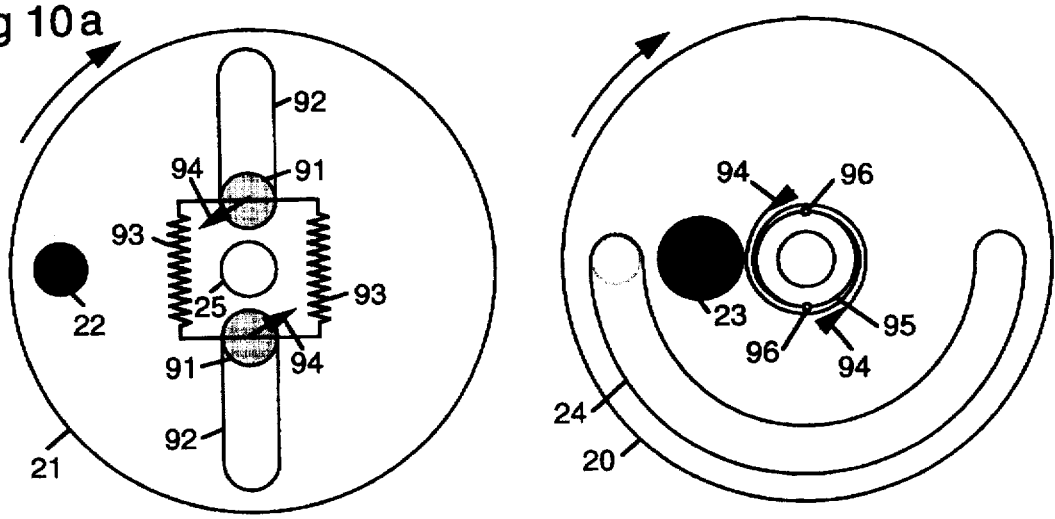
FIG. 10A–C illustrates a governor-type system in which the force-frequency and lost-motion controls are combined in a different way.
Figure 10:
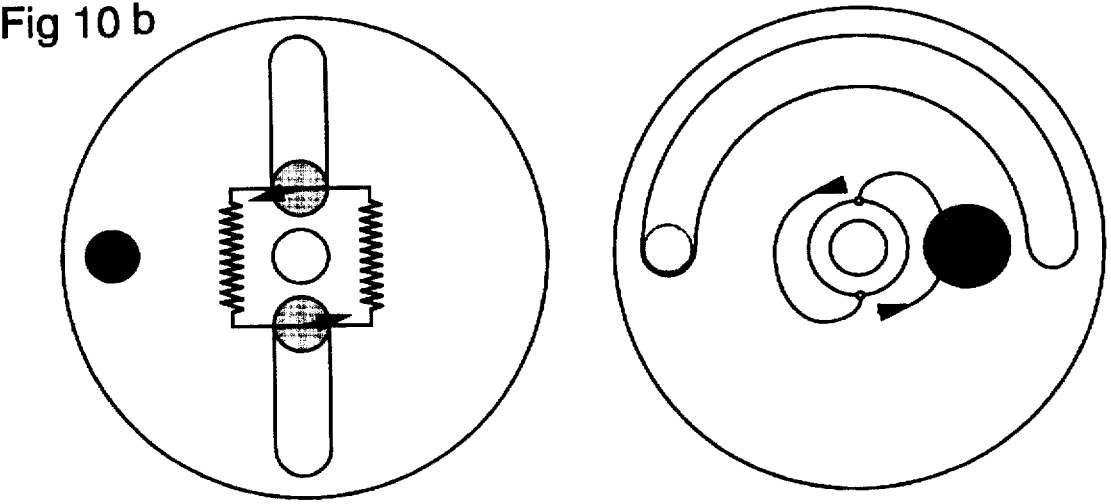
Figure 10:
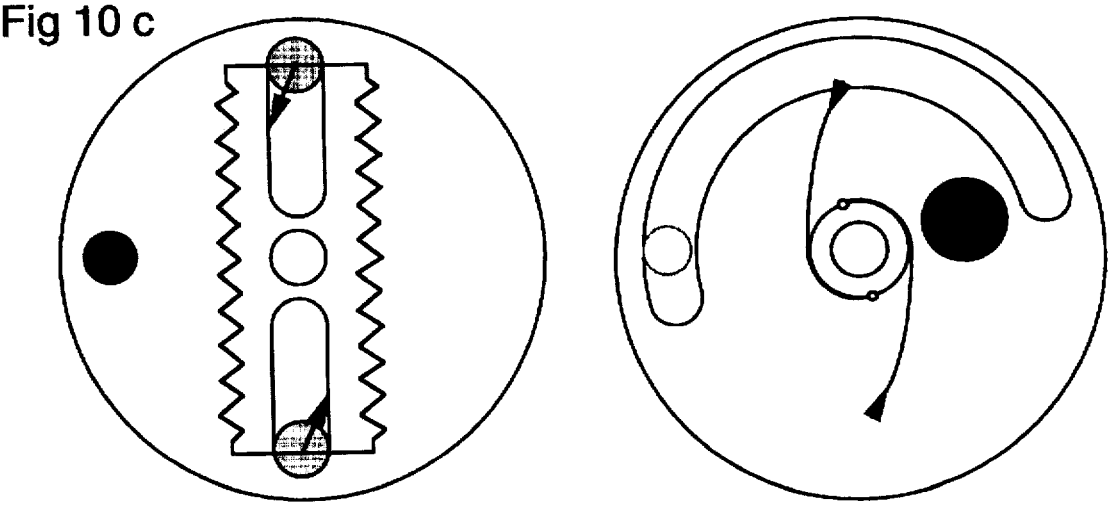

FIG. 10 illustrates yet another method of realizing a desired force-frequency relation. Although of general application, the figure is conveniently described in the context of FIG. 3. The left-hand wheel in FIG. 10a may thus be equated to the lower left-hand wheel 21 of FIG. 3, viewed in elevation from the bottom of FIG. 3; the right-hand wheel in FIG. 10a may be equated to the lower left-hand wheel 20 of FIG. 3, and is therefore behind the left-hand wheel in FIG. 10a.

On the rear face of wheel 21 in FIG. 10a are two masses 91 slidably mounted on radial guides 92 and joined by springs 93. In combination, then, these elements form a balanced governor; at low speed the masses are held at small radius by the springs, but at high speed they fly outward against the springs. Strips of spring metal 94 are fixed to the masses 91 at one end.

The forward face of wheel 20 carries a boss 95. The other ends of strips 94 are fastened to this boss at opposite points 96. In this way movement of the governor masses 91 acts to rotate wheel 20 relative to wheel 21. Thus FIG. 10a, where the masses 91 are at small radius and the masses 22 and 23 are in phase, represents conditions at the end of the vibratory downsweep; the frequency is low and the vibrator eccentricity is maximum. FIG. 10b shows the change as soon as acceleration is applied to wheel 20; the frequency is still low, the vibrator eccentricity is annulled, and the strips 94 uncoil broadly as shown. In this condition the acceleration may continue to high frequency; the governor masses 91 are then at maximum radius. FIG. 10c illustrates the situation shortly after the deceleration commences; the strips 94 are holding a phase difference somewhat less than 180°. Further deceleration allows the masses 91 to come inward, and the phase difference to decrease progressively toward zero.

The preceding figures have illustrated several methods for achieving a desired force-frequency relation for a swinging-weight vibrator, and for annulling the vibration during acceleration and vehicle movement. It is stressed that these illustrations are not intended to be restrictive, and that they are capable of alternative implementation by those skilled in the art. In particular, elements of one of the preceding Figures may be applied to the implementation of another of the Figures without departing from the scope of the invention.

The preceding discussion has been based on the use of separate shafts for the forward-rotating and contra-rotating eccentric masses. It is also feasible to arrange both sets of masses on a single shaft, though the specification of the bearings then becomes more demanding.

Some of the above implementations require only one of the two shafts to be driven (as in FIG. 1); obviously this simplifies the gear or chain arrangement used for the drive between the motor/flywheel and the vibrator. Others require that one shaft be coupled to the motor, and the other to the flywheel; in effect, the flywheel is driven up to speed through the (annulled) vibrator, and so two gear or chain drives are required.

There is now described a preferred arrangement for achieving the objects of the invention. This arrangement is compatible with very large vibrators, provides total flexibility and remote control of the force-frequency relation, and yet uses only simple machinery at the critical and demanding contact with the ground.

The actual vibrator used in this preferred arrangement is that of FIG. 3. Two or more vibrators may be provided on one or more baseplates, as suggested by FIG. 4, and the whole arrangement may be mounted on a vehicle as suggested by FIG. 5. Then the drive system for all the vibrators mounted on a single vehicle may be as illustrated in FIG. 11.

Figure 11:
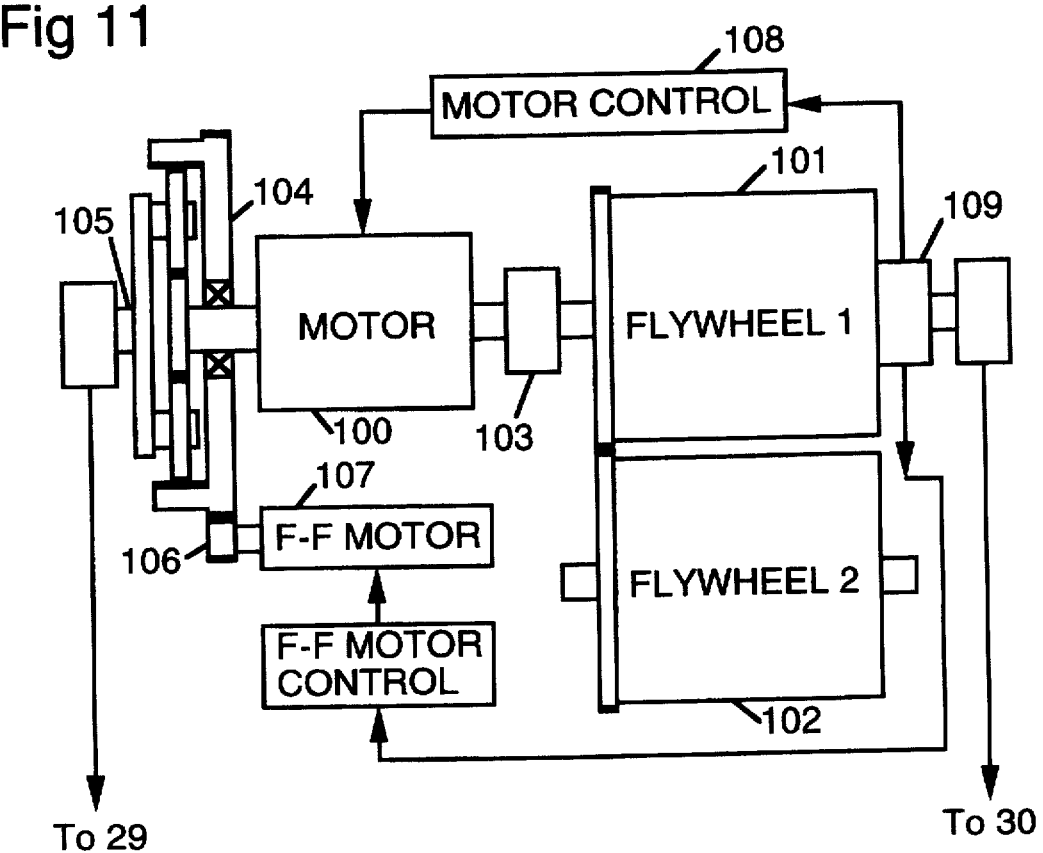
FIG. 11 illustrates a drive and control system that may be used, in particular, in conjunction with the vibrators of FIGS. 3, 4 and 5.

In FIG. 11, the drive motor 100 is energized and controlled by motor control 108, which may include an input from a tachometer or code generator 109. The motor drives two contra-rotating flywheels 101 and 102 through clutch 103. (The contra-rotation reduces gyroscopic effects on the vehicle; each of the two flywheels may be split into a contra-rotating pair for further reduction if desired.) One flywheel then provides the drive, by chain or gear, to coupling 30 of FIG. 3 (for each vibrator on one vehicle).

The motor 100 also drives one input of the differential 104 (which may be of epicyclic type, as illustrated, or of other suitable type). The output 105 of the differential provides the drive, by chain or gear, to coupling 29 of FIG. 3 (for each vibrator). The second input to the differential is provided, through step-down gearing 106, by force-frequency motor 107 (which may be a stepper motor).

Figure 12:
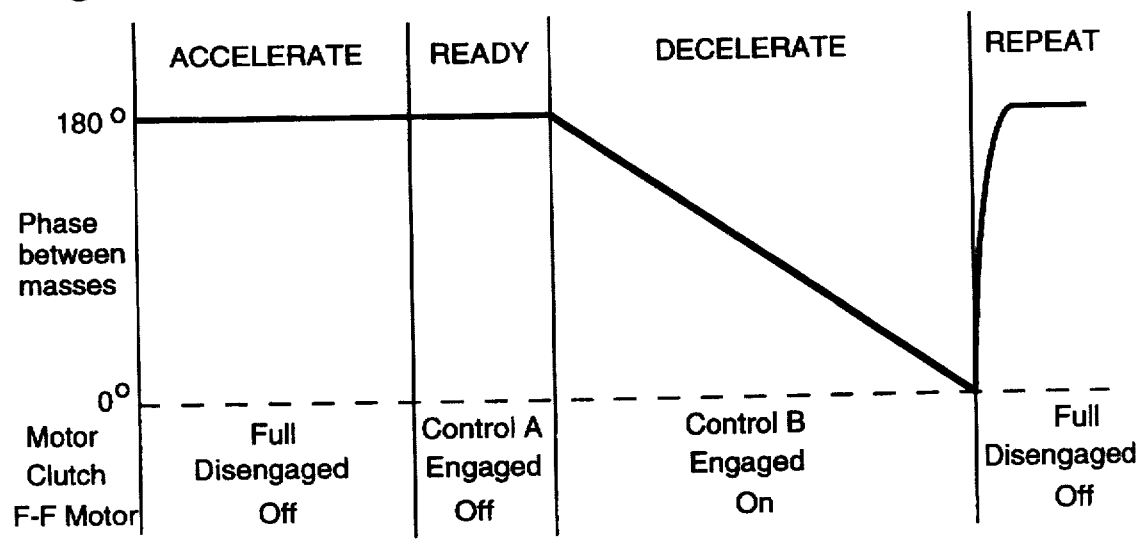
FIG. 12 shows in graphical and tabular form the relation between the vibrator masses of FIG. 3 and the drive and control elements of FIG. 11, during a cycle of operation.

The operation of this arrangement is illustrated in FIG. 12.

During acceleration from rest or from low frequency, the motor 100 is given full drive and the clutch is disengaged; the flywheels are thereby accelerated through the couplings 29 and 30 (and thus through the vibrator). The acceleration provided by the motor, of course, causes the eccentric masses in the vibrator to adopt a phase relationship of 180°, and so annuls the vibration. During this period the force-frequency function motor 107 is off.

As the motor/flywheel system reaches the highest desired frequency (the "ready" condition), there is no relative motion between the motor and the flywheel, and the clutch may be engaged to lock the two together. If only one vibrator vehicle is in use, the system is now ready to start the vibratory downsweep by cutting the power to the motor. However, if a plurality of vibrator vehicles is in use, and the vehicles are close together, it may be desirable to bring the vibrators into phase before starting the downsweep. This is done by controlling the supply of power to the motor (typically on all vibrators except one) until all are in phase; this control is identified as Control A in FIG. 12.

When the power to the motor is cut, the system decelerates from the highest desired frequency towards the lowest desired frequency. During this deceleration the relative phase of the two masses in each vibrator (such as 22 and 23 in FIG. 3) may be controlled by appropriate excitation of force-frequency motor 107, using the measure of frequency provided by tacho 109. In this way a resultant vibratory force proportional to the first power of frequency (for example), or independent of frequency, may be provided; the chosen relation may be applied to the whole of the frequency range, or to just a part of it.

The deceleration rate also may be controlled, by maintaining partial excitation of the motor 100 during the vibratory downsweep. This control (Control B in FIG. 12) may be used for at least two ends. The first is to maintain the cycle-by-cycle synchronism of the vibrators on a plurality of vehicles; this synchronism may be relative to one of the vehicles, or to some average of them, or to a prescribed master sweep. The second (which may be used in conjunction with the first) is to provide a controllable reduction in the deceleration rate; in particular, this may be used, in a multisource application, to maintain the frequency of one group of vibrators between the fundamental and second (or other) harmonic of another group, as set out in copending application Ser. No. 08/712,432. In either case, of course, the linear phase-time relation suggested in FIG. 12 is for purposes of illustration only; the actual phase-time relation employed may take any desired realizable form.

The desired performance shown generally in FIG. 12 may be realized using technical variations on the arrangement of FIG. 11; all such variations are encompassed within the scope of the invention.

I claim:

1. An eccentric-mass vibrator consisting of a rotating support means and one or more masses of which at least one is capable of motion relative to the said support means between first and second defined positions, such defined positions being such that in one of them the rotating structure is balanced and engenders no vibration while in the other the structure is unbalanced and engenders vibration, and in which the said relative motion between said first and second defined positions is induced on acceleration of the rotation and between said second and first defined positions on deceleration of the rotation.

2. A vibrator according to claim 1 in which the said relative motion between first and second defining positions is a change of rotatory phase of defined angle.

3. An eccentric-mass vibrator for use in seismic exploration, such use involving repeated cycles each including a period of acceleration and a period of deceleration, in which the active rotating mass is formed in a plurality of parts capable of relative motion between a first limit corresponding to rotatory balance of the parts without vibration and a second limit corresponding to rotatory unbalance with vibration, and in which the forces to cause such relative motion are generated in one direction by the said acceleration and in the other direction by the said deceleration.

4. A vibrator according to claim 3 in which the active rotating mass includes two parts having substantially equal mass-radius product at the said first limit and in which the said relative motion includes a relative rotatory phase change of substantially 180 degrees between the parts.

5. A vibrator according to claim 3, in which a motor supplies energy to the vibrator during acceleration and a flywheel supplies energy during deceleration.

6. A vibrator according to claim 5, in which the vibrator's natural change of frequency with time, during deceleration powered by the flywheel, is modified by the controlled supply of energy to the motor.

7. A vibrator according to claim 6, in which the control of energy supplied to the motor is provided by a feedback loop adapted to maintain synchronism with a particular frequency-time relation chosen as a reference.

8. A vibrator according to claim 5, in which the said flywheel is formed of an even number of contra-rotating flywheels.

9. A vibrator according to claim 3, in which the effective force output of the vibrator during vibration is controlled by the setting of the said second limit.

10. A vibrator according to claim 3, in which the effective force output of the vibrator during vibration is controlled by varying the degree of unbalance between the said plurality of parts.

11. A vibrator according to claim 10, in which the said degree of unbalance is controlled by varying the phase between said parts, and in which only the vector resultant of the vibratory forces generated by the said parts is applied to the bearings of the vibrator.

12. A vibrator according to claim 10, in which the said degree of unbalance is controlled by varying the proportion of the total eccentric mass represented by each of said parts, and in which only the vector sum of the vibratory forces generated by the said parts is applied to the bearings of the vibrator.

13. A vibrator according to claim 10, in which the said degree of unbalance is controlled by varying the eccentric radius of one or more of said parts, and in which only the vector sum of the vibratory forces generated by the said parts is applied to the bearings of the vibrator.

14. A vibrator according to claim 10, in which the said control is exercised by the resultant of a spring force and a centrifugal force.

15. A vibrator according to claim 11, having a differential inserted between the said parts, the input to the differential including a motion to effect and control said variation of phase.

16. A seismic vibrator in which a rotating eccentric mass is formed in a plurality of parts capable of a first and rapid relative motion between positions representing unbalanced vibration and balanced absence of vibration, by means of which first motion the vibration may be quickly initiated and quickly annulled, and also capable of a slower and controlled second relative motion within the range of unbalanced vibration, by means of which second motion the resultant force output of the vibrator may be varied as a function of frequency while applying only this resultant force to the vibrator bearings.

* * * * *